UNITED STATES PATENT OFFICE.

JOHN H. GOLL AND ALEXANDER SPINNER, OF SAN FRANCISCO, CALIFORNIA.

PROCESS OF PREPARING BAKERS' YEAST.

SPECIFICATION forming part of Letters Patent No. 267,686, dated November 21, 1882.

Application filed October 18, 1878.

*To all whom it may concern:*

Be it known that we, JOHN HENRY GOLL and ALEXANDER SPINNER, of San Francisco and county of San Francisco, in the State of California, have invented a certain new and useful Process of Manufacturing Bakers' Yeast, of which the following is a specification.

This invention relates to that class of compounds used to raise or lighten the dough in the manufacture of bread; and it consists in a new composition of certain ingredients combined together in separate mixtures, which are then united and incorporated together to form the compound after the manner hereinafter described.

To prepare our improved bakers' yeast we first make a mixture of the following ingredients: boiling water, two quarts; wheat-flour, two ounces; to which, after it has cooled, we add one ounce of malt-flour, and let the whole stand in a warm place for two days, or less, as required. On the next day, or as soon as the foregoing mixture is ready, we make a paste from one pound of wheat-flour mixed with hot water into a thick mass, and to this we add one pound of boiled potatoes peeled and mashed and rubbed together with the white of four eggs, and the whole intimately mixed together. To this mass or mixture we then add a second mixture of the following ingredients: malt-flour, one-half pound; boiling water, two gallons. The liquor of the mixture number one, or that allowed to stand two days, is then drained off, and the remaining solid or pasty matter is mixed with and incorporated in the mass formed of all the above-named ingredients. This compound is then kept in a cool place for two days, and at the end of that time it is spread out upon a cloth to drain off the liquid part, and is otherwise treated to express or get rid of the excess of liquid, when it is ready to be made up into packages of any required size and weight for sale.

This article we thus compound of the above-named ingredients in about the proportions given, and the process of making the first mixture and letting it stand until the fermentation or change has taken place, and then forming the second mixture and incorporating the two together, will all be understood by any person familiar with the use and preparation of articles of this kind, and we produce by this means a yeast for bakers' use that is superior to any now employed.

We claim as our invention—

The herein-described process of manufacturing bakers' yeast, which consists in the following essential steps, viz: preparing a mixture of boiling water and wheat-flour, cooling the same and adding malt-flour, fermenting, and decanting excess of water, then incorporating with the remaining pasty mass an unfermented mixture of hot water, wheat-flour, mashed potatoes, white of eggs, and malt-flour, in about the proportions stated, allowing the mass to stand for two days, then removing surplus moisture and forming into marketable packages, as specified.

In testimony that we claim the foregoing we have hereunto set our hands and seals this 3d day of September, 1878.

JOHN HENRY GOLL. [L. S.]
ALEXANDER SPINNER. [L. S.]

Witnesses:
C. W. M. SMITH,
EDWARD E. OSBORN.